(12) United States Patent
Jensen

(10) Patent No.: US 10,162,606 B2
(45) Date of Patent: Dec. 25, 2018

(54) COMPUTER-IMPLEMENTED METHOD FOR GENERATING AND VISUALIZING DATA STRUCTURES

(71) Applicant: Apiosoft APS, København NV (DK)

(72) Inventor: Thøger Kari Jensen, København S (DK)

(73) Assignee: Apiosoft APS, København NV (DK)

(*) Notice: Subject to any disclaimer, the term of this patent is extended or adjusted under 35 U.S.C. 154(b) by 190 days.

(21) Appl. No.: 15/103,133

(22) PCT Filed: Dec. 9, 2014

(86) PCT No.: PCT/EP2014/077020
§ 371 (c)(1),
(2) Date: Jun. 9, 2016

(87) PCT Pub. No.: WO2015/086582
PCT Pub. Date: Jun. 18, 2015

(65) Prior Publication Data
US 2016/0313982 A1    Oct. 27, 2016

(30) Foreign Application Priority Data
Dec. 9, 2013    (DK) .................................. 2013 70754

(51) Int. Cl.
*G06F 9/44*    (2006.01)
*G06F 9/45*    (2006.01)
(Continued)

(52) U.S. Cl.
CPC .............. *G06F 8/34* (2013.01); *G06F 3/0482* (2013.01); *G06F 3/0484* (2013.01); *G06F 8/71* (2013.01); *G06F 9/4443* (2013.01)

(58) Field of Classification Search
CPC .......... G06F 8/34; G06F 8/24; G06F 11/3466; G06F 11/3604; G06F 11/2247;
(Continued)

(56) References Cited

U.S. PATENT DOCUMENTS

| 5,257,363 A | 10/1993 | Shapiro et al. |
| 5,675,753 A | 10/1997 | Hansen et al. |

(Continued)

FOREIGN PATENT DOCUMENTS

| CN | 102930026 | 2/2013 |
| EP | 1198918 | 4/2002 |

OTHER PUBLICATIONS

Luk et al., Fast and lossless graph division method for layout decomposition using SPQR-tree, Nov. 2010, 4 pages.*
(Continued)

*Primary Examiner* — Thuy Dao
(74) *Attorney, Agent, or Firm* — McHale & Slavin, P.A.

(57) ABSTRACT

A computer-implemented method for generating and visualizing data structures, notably hierarchal data structures, comprising a plurality of nodes in a tree structure, at least some of which comprise intrinsic properties, wherein at least one of said primary and secondary nodes represents a data object of or a data interface towards a computer-implemented model of a physical structure. A visual representation of the plurality of nodes is created in a graphical user interface of the computer system. A user of the computer system is allowed to select data modules and to combine the selected data modules to build the data structures. Functional relations between data values of the nodes are provided to at least partially define the computer-implemented model on the basis of the intrinsic data of the nodes and on the basis of the mutual functional relations. The user interface comprises functionality permitting a user of the com- (Continued)

puter system to define functions which can be referenced in or called by the functional relations.

12 Claims, 15 Drawing Sheets

(51) Int. Cl.
 G06F 17/30 (2006.01)
 G06F 8/34 (2018.01)
 G06F 8/71 (2018.01)
 G06F 3/0482 (2013.01)
 G06F 3/0484 (2013.01)
(58) Field of Classification Search
 CPC ............. G06F 11/3409; G06F 11/3612; G06F 11/3636; G06F 8/71; G06F 8/4442; G06F 3/0482; G06F 3/0484
 See application file for complete search history.

(56) References Cited

U.S. PATENT DOCUMENTS

| | | | |
|---|---|---|---|
| 6,823,299 B1 | 11/2004 | Contreras et al. | |
| 6,895,371 B1 | 5/2005 | Ames et al. | |
| 7,623,139 B1 | 11/2009 | Gifford et al. | |
| 8,146,053 B2* | 3/2012 | Morrow | G06F 8/34 715/763 |
| 8,825,459 B2* | 9/2014 | Aish | G06F 8/34 703/7 |
| 8,907,988 B2* | 12/2014 | Poston | G06F 3/0482 345/619 |
| 9,235,410 B2* | 1/2016 | Kannan | G06F 8/71 |
| 9,417,990 B2* | 8/2016 | Michelsen | G06F 8/34 |
| 9,471,609 B2* | 10/2016 | Kienzle | G06F 3/0484 |
| 2002/0069039 A1 | 6/2002 | Ricks et al. | |
| 2005/0050475 A1 | 3/2005 | O'Rourke et al. | |
| 2006/0284869 A1 | 12/2006 | Kasprzak et al. | |
| 2007/0091119 A1 | 4/2007 | Jezyk et al. | |
| 2008/0104570 A1* | 5/2008 | Chedgey | G06F 8/75 717/105 |
| 2008/0301656 A1* | 12/2008 | Archambault | G06F 8/4441 717/157 |
| 2012/0078588 A1 | 3/2012 | McDaniel | |
| 2013/0091487 A1* | 4/2013 | Chandra | G06F 21/563 717/106 |
| 2013/0144566 A1* | 6/2013 | De Biswas | G06T 17/005 703/1 |

OTHER PUBLICATIONS

Georgescu et al., Software design for decoupled parallel meshing of CAD models, May 2013, 8 pages.*

G-F. Zhang, Well-constrained completion for under-constrained geometric constraint problem based on connectivity analysis of graph, Mar. 2011, 6 pages.*

* cited by examiner

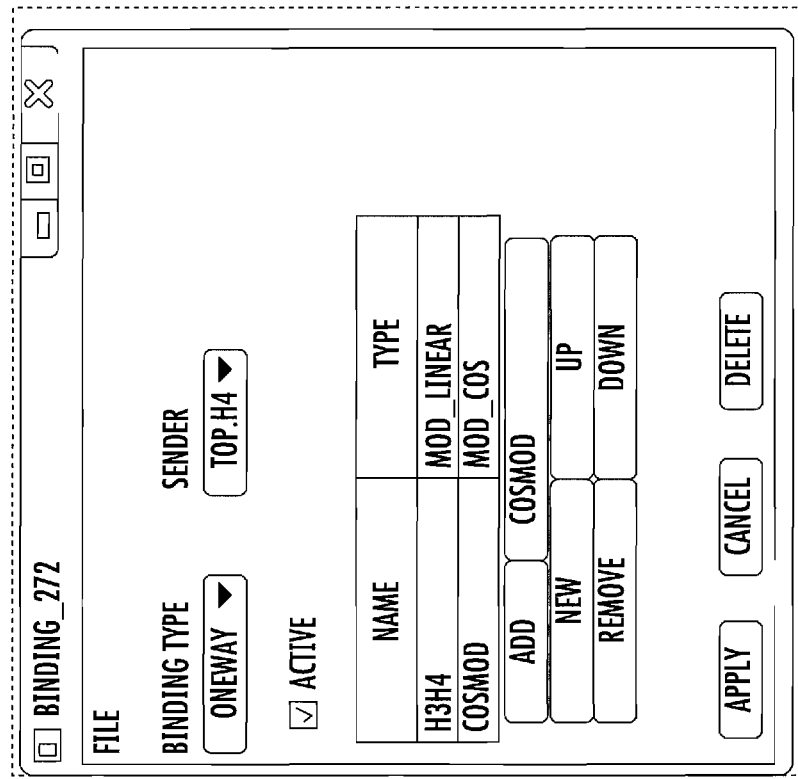

COMPUTER-IMPLEMENTED METHOD FOR GENERATING AND VISUALIZING DATA STRUCTURES

CROSS REFERENCE TO RELATED APPLICATIONS

This is a national stage filing in accordance with 35 U.S.C. § 371 of PCT/EP2014/077020, filed Dec. 9, 2014, which claims the benefit of the priority of Denmark Patent Application No. PA 2013 70754, filed Dec. 9, 2013, the contents of each are incorporated herein by reference.

TECHNICAL FIELD

The present invention relates to a computer-implemented method for generating and visualizing data structures, notably hierarchal data structures in a computer system for use in, e.g., a CAD (Computer Aided Design) and/or CAM (Computer Aided Manufacturing) system. The data structures comprise a plurality of nodes in a tree structure or a tree-like structure, wherein at least some of the nodes comprise properties. The nodes represent a data object of a computer-implemented model of a physical structure or a data interface towards a computer-implemented model of a physical structure.

BACKGROUND OF THE INVENTION

Various systems are known for complex data communication, data manipulation and data generation, which are applicable notably to mathematical data such as vectors, matrices and scalars. Such systems may have programmatic objects with visual counterparts in the form of modules and provide the capability of creating relations between data represented by the modules, for example by routing data connections from output anchors to input anchors of the modules.

SUMMARY OF THE INVENTION

It is an object of embodiments of the invention to provide a computer-implemented method which facilitates handling of data structures, such as, but not exclusively hierarchal data structures. It is a further object of embodiments of the invention to provide a computer-implemented method, which provides improved user functionality for generating and visualizing such data structures.

In a first aspect, the invention provides a computer-implemented method for generating and visualizing data structures, notably hierarchal data structures, in a computer system, wherein each of said data structures comprises a plurality of nodes in a tree structure. The plurality of nodes comprises primary nodes, which comprise intrinsic properties, and optionally secondary nodes which are void of intrinsic properties. The intrinsic properties may include data and/or functions. At least one of said primary and secondary nodes represents a data object of or a data interface towards a computer-implemented model of a physical structure. The method according to the first aspect of the invention comprises the steps of:
generating a plurality of said nodes;
creating a visual representation of the plurality of nodes in a graphical user interface of the computer system, in which the nodes are represented as a plurality of data modules;
providing functionality in the graphical user interface allowing a user of the computer system to select data modules from said plurality of data modules and to combine the selected data modules to build said data structures;
generating mutual functional relations between data values of at least two of said primary nodes, so as to at least partially define said computer-implemented model on the basis of the intrinsic data of the primary nodes and on the basis of said mutual functional relations,
wherein said mutual functional relations are determined on the basis of user selection defining the functional relation either
so as to equate the respective data values of the at least two nodes or
so as to define the functional relation as a functional call, which takes the data value of one primary node as an input and produces an output which sets the data value of another primary node;
and wherein the user interface comprises functionality permitting a user of the computer system to define functions which can be referenced in or called by said functional relations.

The data object may represent a physical structure, part of the physical structure and/or properties thereof. For example, the first and second notes may identify components, dimensions or other properties of components, control system functions, mutual relations of functions or components of complex systems, such as control systems.

As used herein, the term tree structure should be understood to broadly to encompass any tree or tree-like structure. For example, the tree structure may comprise a root value and subtrees of children represented as a set of linked nodes. However, the tree structure within the meaning of the present invention may include any set of nodes with any number of backward and/or forward and/or sideward links between nodes.

The term "nodes" should be understood to include nodes in a tree structure as defined above and/or values (fields) of data classes.

According to the present invention, the functional relations between the data values of said at least two primary nodes may be at least partially determined by a user, e.g. via the user interface, as the user interface comprises functionality permitting the user to define functions, which can be referenced in or called by the functional relations. Hence, changes to the data of one node may automatically update data of another node in accordance with the functions defined by the user. Accordingly, complex structures may be generated and modified whilst ensuring coherence of the nodes making up the data structures.

At least some of said data modules may define functions, and at least one of the mutual functional relations between data values of the at least two of said primary nodes may include links to at least one of said functions.

The functional call of the functional relation may comprise a call to a chain of functions. The chain of functions may comprise different functions or multiple calls to or duplications of one function. The chain of functions may in one embodiment of the invention comprise at least two functions, wherein each function produces an output, which a next one of the functions takes as an input. For example, a first function of said chain of functions may take the data value of one primary node as its input, and a last function of the chain of functions may set the data value of another primary node.

A point of data reception for at least one of said functional relations may be visually represented in the graphical user interface, e.g. as a sink anchor. Likewise, a point of data transmission for at least one of the functional relations may visually represented in the graphical user interface, e.g. as a source anchor.

The step of creating the visual representation of the data structures may comprise visualizing the functional relations.

The method according to the first aspect of the invention may comprise the step of providing an option for a user selection to disable and enable said functional relations.

The primary and secondary nodes may comprise arrays of data, such as vectors or multi-dimensional matrices.

In one embodiment of the present invention, the computer system embodies a computer aided design (CAD) system, and the physical structure comprises an assembly of components in said CAD system.

In a second aspect, the present invention provides a computer system comprising a processor, a storage medium accessible by said processor, and a user interface, wherein the storage medium is loaded with program including functionality for causing the processor and user interface to carry out the invention according to the first aspect of the invention.

As used herein the term "computer system" may be embodied by any suitably configured single computer, or any suitably configured network of computers, comprising, e.g., distributed storage facilities at mutually locate locations, such as those applied in cloud systems, which storage facilities constitute the storage medium within the meaning of the present invention. Likewise, the processor of such computer system should be understood to comprise any single processor any combined processor system of a plurality of computers in a cloud or other kind of network.

BRIEF DESCRIPTION OF THE FIGURES

FIG. 13 illustrates a class structure;

FIG. 14 illustrates an example of a binding property window;

DETAILED DESCRIPTION OF EMBODIMENTS OF THE INVENTION

Embodiments of the invention will now be further discussed with reference to the accompanying figures.

Figure 1:
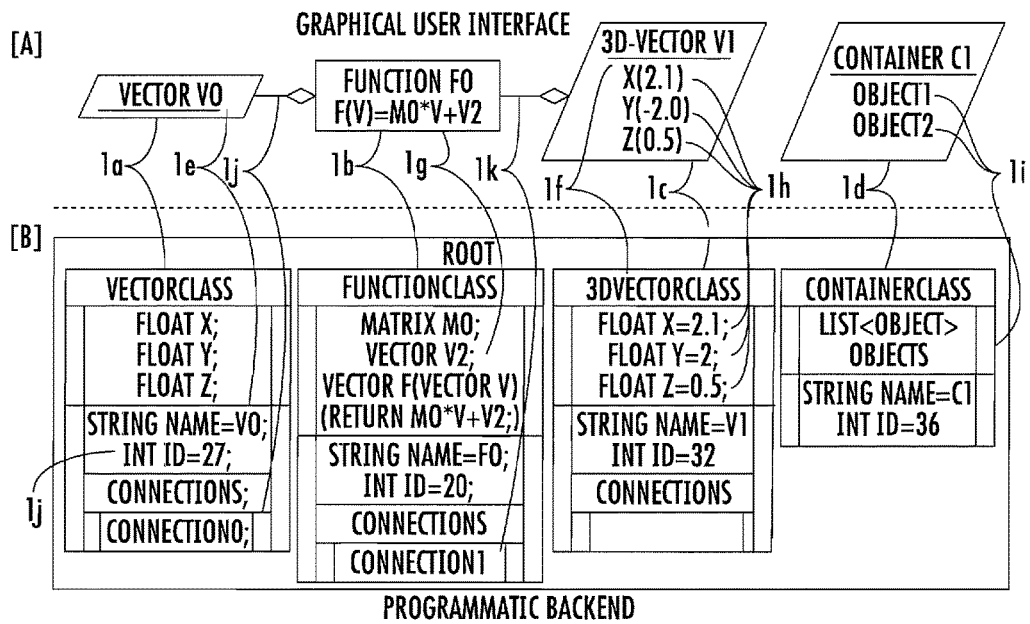
FIG. 1 illustrates multiple modules of conventional software, shown with a graphical user interface (A) and a programmatic backend (B)

FIG. 1 depicts an instance with three modules of typical conventional modular software. As shown, such modular software consists of a graphical user interface (GUI) for the user of the software to interact with (A) and a programmatic backend (B) that contains instances of classes and data objects—from here on called instance modules to discern them from the visual GUI modules—whose data structure is in some way reflected in the GUI, typically by assigning each instance module with a visual module in the GUI. The name "module" implies that the data structure of the programmatic backend—from here on called the modular engine—can be changed by rearranging either the instance modules themselves or the relationships between them.

This instance contains four instance modules (1a-d) with their corresponding visual modules. As shown in the figure, some of the data contained in the instance modules are displayed in the visual modules, such as the name (1e), type (1f), functionality (1g) and user accessible data (1h and 1i) of the module. Data can be intrinsic, such as the components of a 3D-vector (1h) or it can be a dynamic list of data objects (1i.) Other data might be hidden from the user, for instance auxiliary data for background calculations or local or global identifiers for the engine to keep track of the modules (1*j*). Due to the large modular setups that can be created, it may be advantageous to arrange the modules as nodes in a hierarchical tree, wherein the root node contains all the modules within a given context as child nodes, and wherein the data of these modules are child nodes of the modules themselves, possibly having child nodes themselves. Modules may be divided into primary nodes; nodes that have intrinsic data properties themselves (1*a-c*), and secondary nodes; nodes that have no intrinsic data but can be used for instance to store other nodes in order to group them together (1*d*). Root nodes would thus often be considered secondary nodes.

In FIG. 1, modules 1*a* and 1*c* are data modules while 1*b* is a so-called functional module. Modules 1*a* and 1*c* represents vector data, which may come from control points on curves or surfaces, or be reference points for the geometry. The visual module 1*b* represents a functional module, that is, a module that contains or references a function. In general, a functional module may represent a simple mathematical operation such as the one indicated by 1*g*, an algorithm, or a proper function call to the underlying software. Module 1*b* represents a function that takes a vector as an input, left-multiplies it with a matrix and adds a vector, in other words a matrix transformation followed by a translation producing a vector as an output. With such a module, the modular engine is capable of creating functional relations, also called bindings, between the two vector data modules through this functional module. This happens by creating data relationships that equate the input of one module with the output of another. When the user creates visual connections (1*j*) from vector 1*a* to 1*b* and one from 1*b* to is (1*k*), the software creates relationships on the code level between 1*a* and 1*b*, as well as 1*b* and 1*c*. When the value of a1 is changed, the software will dispatch the value via 1*j* to module 1*b* which will apply its function to the vector and send the result via 1*k* to update the value of 1*c* accordingly. In this way module 1*c* becomes dependent on module 1*b* according to the function defined in module 1*b*.

Figure 2:
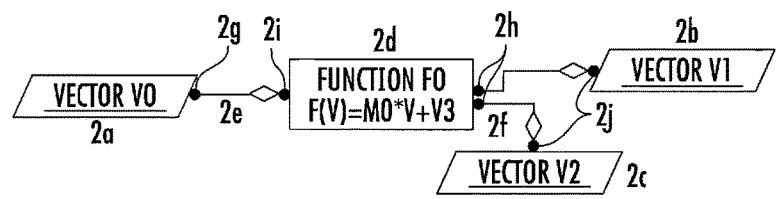
FIG. 2 illustrates multiple modules of conventional software similar to FIG. 1, shown with three vectors, 2a, 2b, and 2c, one functional module, 2d, one input connection, 2e, and two output connections (2f)

Often in contemporary modular software similar to that displayed in FIG. 1, functional modules such as 1*b* has one to one functionality; that is, only one input connection and one output connection is allowed per functional module. However, in a few programs (such as Jeskola Buzz as generally disclosed at http://www.buzzmachines.com at the filing date of the instant application) more than one output connection can be realized. This is exemplified in FIG. 2 which shows a similar setup to FIG. 1, only with three vectors, 2*a-c*, one functional module, 2*d*, one input connection, 2*e*, from 2*a* to 2*d*, and two output connections (2*f*) from 2*d* to 2*b* and 2*d* to 2*c*. When the value of 2*a* is changed, 2*d* will apply its mathematical operation and dispatch the result to 2*b* and 2*c*. Connections will be required to adjust visually if the modules to which they connect are moved on the visual surface, typically by anchoring the ends to specific spots on the modules, so-called input anchors (2*g*, 2*h*) and output anchors (2*i*, 2*j*). These anchors can be visible as in FIG. 2, completely invisible, or become temporarily visible when the mouse cursor hoovers near. In most cases it is advantageous to make them double as visual cues in some way in order to make it easier for the user to create connections. In some software the anchors are relatively free to change place on its module if that provides a shorter or more aesthetic visual route for the connection from the source anchor to the sink anchor, such as with the connection between module 2*d* and 2*c*.

Figure 3:
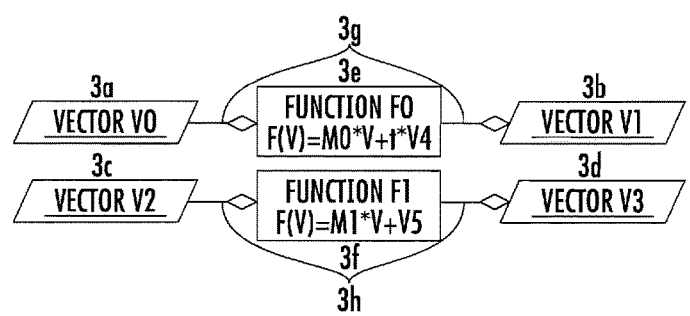
FIG. 3 illustrates four vectors, 3a, 3b, 3c, and 3d, two identical functional modules, 3e and 3f, and four connections (3g, 3h) routing 3a to 3b through 3e and 3c to 3d through 3f.

Due to the connection restrictions on contemporary modular software, if the same function is to be used more than once, two or more identical functional modules must be created. Such a situation is displayed in FIG. 3, with four vectors, 3*a-d*, two identical functional modules, 3*e* and 3*f*, as well as four connections (3*g*, 3*h*) routing 3*a* to 3*b* through 3*e* and 3*c* to 3*d* through 3*f*. A possible solution to this may be to allow additional inputs and outputs to the functional module, by pre-creating or allowing the creation of input-output pairs. Such a solution is displayed in FIG. 4 with four vectors, 4*a-b*, a functional module, 4*c*, and four connections, 4*d-e*. In this case, the 4*a* modules connect to the 4*b* modules via sink and source anchors, 4*f* and 4*g*, through 4*c*. This type of solution may reduce the number of functional modules necessary for a more sophisticated modular setup, but it still requires four visible connections and there is an upper limit to the number of input/output pairs that can be fitted along the sides of the functional module.

Figure 4:
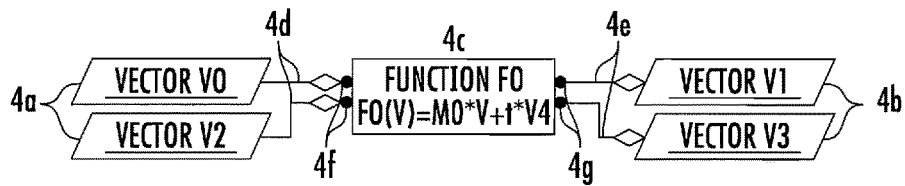
FIG. 4 illustrates four vectors, 4a, 4b, 4c, and 4d, a functional module, 4c, and four connections, 4d-e.
Figure 5:
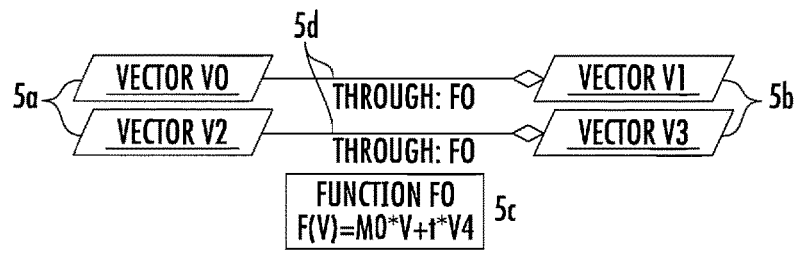
FIG. 5 illustrates four vectors, 5a-b, one functional module, 5c, and two connections, 5d and 5e.

The invention is illustrated in FIG. 5, with four vectors, 5*a-b*, one functional module, 5*c*, and two connections, 5*d* and 5*e*. In contrast to FIGS. 1-4, it is not necessary to specify routing through the functional modules directly; instead routing through functional modules is specified on the connection level by way of referencing the desired routing arrangement through the modules and thereby the functions that will be applied to the data of the connection. This innovation allows the user to interact with the functional module like with any other module while reducing the visual clutter.

Figure 6:
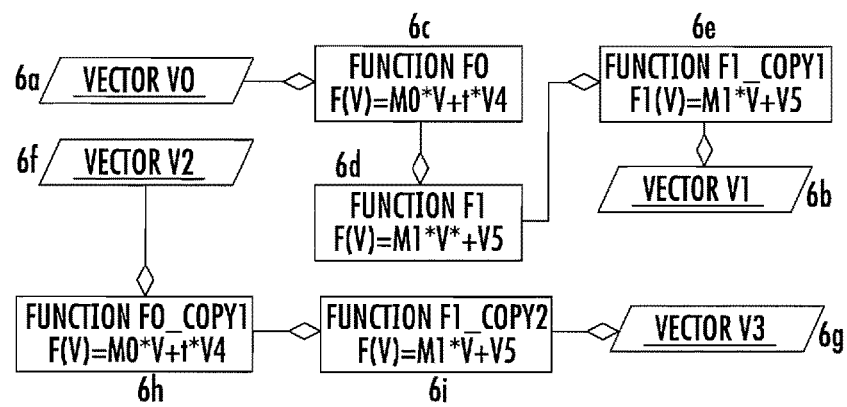
FIG. 6 illustrates a mathematical relationship set up with one vector, 6a, connected to another, 6b, through three functional modules, 6c-e by four explicit connections while another vector, 6f, is connected to vector 6g through two functional modules, 6h-i via three connections.
Figure 7:
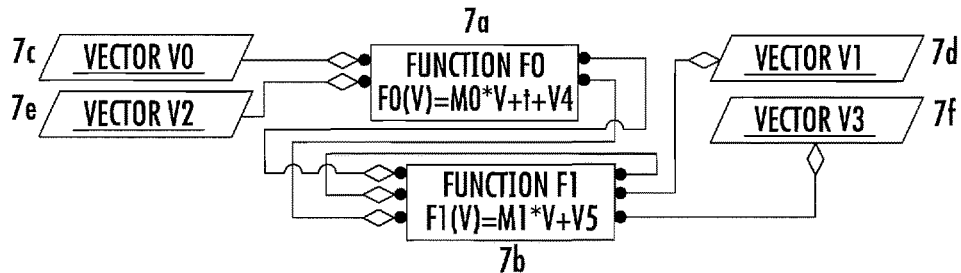
FIG. 7 illustrates an alternative modular relationship.

Due to the nature of the invention it is no longer necessary to create copies of a functional module in order to route data through it more than once. Indeed, it becomes possible to simply reference the same module in any number of binding and any number of times in each binding. The value of this is put into perspective when the setups get more complicated. FIG. 6 shows a complex mathematical relationship set up in the fashion one would do in conventional software: One vector, 6*a*, is connected to another, 6*b*, through three functional modules, 6*c-e* by four explicit connections while another vector, 6*f*, is connected to vector 6*g* through two functional modules, 6*h-i* via three connections. The functional modules 6*c* and 6*h* are identical, with 6*h* being a copy of 6*c*, while 6*e* and 6*i* are copies of 6*d*. FIG. 7 shows a functionally identical but visually different setup, with the alternative solution also shown in FIG. 4. For this setup using additional sink and source anchors on the modules, only two functional modules (7*a*, 7*b*) are needed to connect module 7*c* to module 7*d*, and module 7*e* to module 7*f*. However, seven connections are still required to fully define the relationships and all the connections are connecting through the same modules, causing the visual complexity to still be high even for such a moderate setup.

Figure 8:
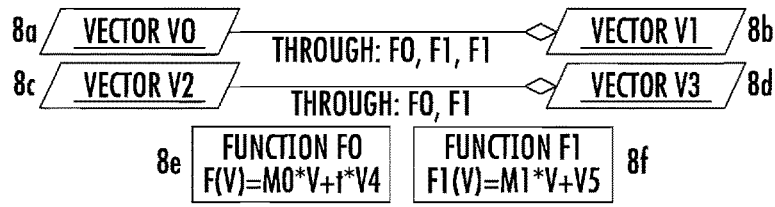
FIG. 8 illustrates a modular relationship with four vectors 8a-d and two functional modules, 8e and 8f.

In contrast, FIG. 8, shows an identical modular relationship to FIGS. 6 and 7, using an embodiment of the invention: like in FIG. 7, the setup contains only four vectors 8*a-d* and two functional modules, 8*e* and 8*f*. In contrast, however, only two connections, 8*g* and 8*h*, are necessary between the four vectors. Instead of explicitly and visually routing the data through the functional modules, the functional relationship is declared and determined at the binding level. Thus, binding 8*g* is declared to apply the function of functional module 8*a* once followed by the function of 8*b* twice in a row. Binding 8*h* is declared as going through 8*a* and 8*b*. Clearly this type of setup reduces the visual complexity the user has to deal with as well as the number of connections that needs to be drawn.

In addition to improving the overall transparency of a modular setup, the invention also allows the functional modules to behave similarly to any other module; since there is no need to reserve space for additional input and output connections as in FIGS. 4 and 7, more room is available for other interaction points.

Figure 9:
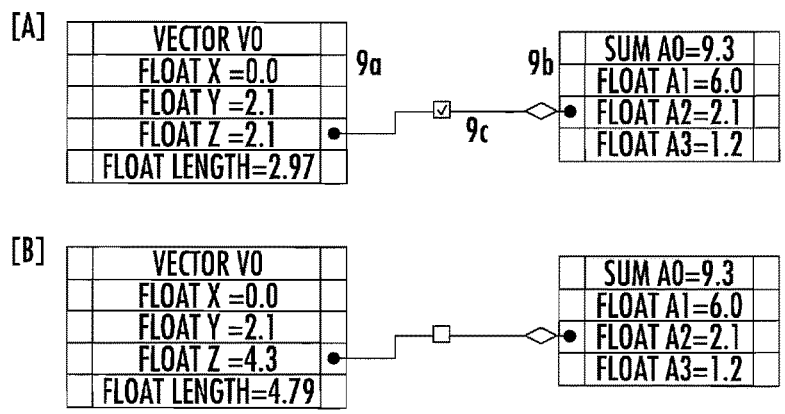
FIG. 9 illustrates a visual hierarchical tree.

In a current form of the invention, all modules are represented in a type of visual hierarchical tree that resemble their structure at the data-level as shown in FIG. 9: Each individual module on the visual surface area (parent modules) has its data arranged in arrays of smaller visual modules (child nodes), allowing the user direct access to the data of each child module within a module. Modules representing 3D vectors (9*a*) can thus have its coordinates represented as three floating point modules, and modules representing a mathematical sum (9*b*) will contain the sum elements. This makes it possible to swiftly create functional relationships between the data contents of a module (9*c*) by adding sink and source anchors to the child nodes—in this case represented as the squares to the left and right of the nodes. This figure also introduces another innovation: an indicator—in this case a checkbox—on each binding that shows whether or not the binding is activated. Thus, when the checkbox is checked as in FIG. 9A, the information travels through the binding and equates the two values; when unchecked, the receiving value does not change when the sender does as seen in FIG. 9B. The user can thereby detach a binding by a simple click. Furthermore it is possible to bind directly to such a checkbox and thereby control it via data from the model. This can be done simply by e.g. Boolean values, where a non-zero value activates the binding and a value of zero deactivates it.

Figure 10:
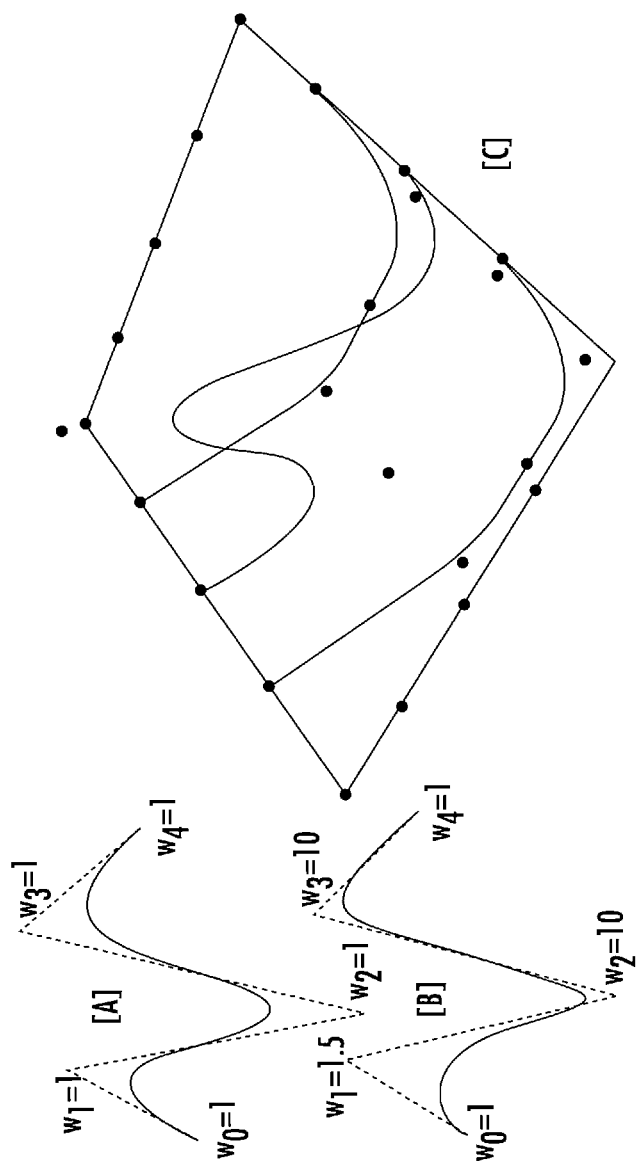
FIG. 10 illustrates an example of a Non-uniform Rational B-Spline (NURBS) module.

Another example of a useful module for CAD applications is the Non-uniform Rational B-Spline (NURBS) module. A NURBS is a parametric, piecewise polynomial curve (FIG. 10A and B) or surface (FIG. 10C) that interpolates between a number of control points through a number of parameters. In the case of a curve, the NURBS interpolates between n control points, $P_1$, $P_2$, . . . , $P_n$, through a parameter $t \in [k_o \ldots k_{n+order}]$, where the values $k_0$, $k_1$, . . . , $k_{n+order}$ are called the knot vector and determines how the t-parameter relates to the position (P(t)) along the curve. The k-values must always adhere to the rule $k_m \leq k_{m+1}$. The order determines the polynomial degree, order=degree+1, of the curve. In addition to this, a NURBS contains one so-called weight for each control point, $w_0$, $w_1$, . . . , $w_n$, that determines how much the curve is pulled toward each control point. The effect of changing the weights are shown in FIGS. 10A and 10B.

Figure 11:
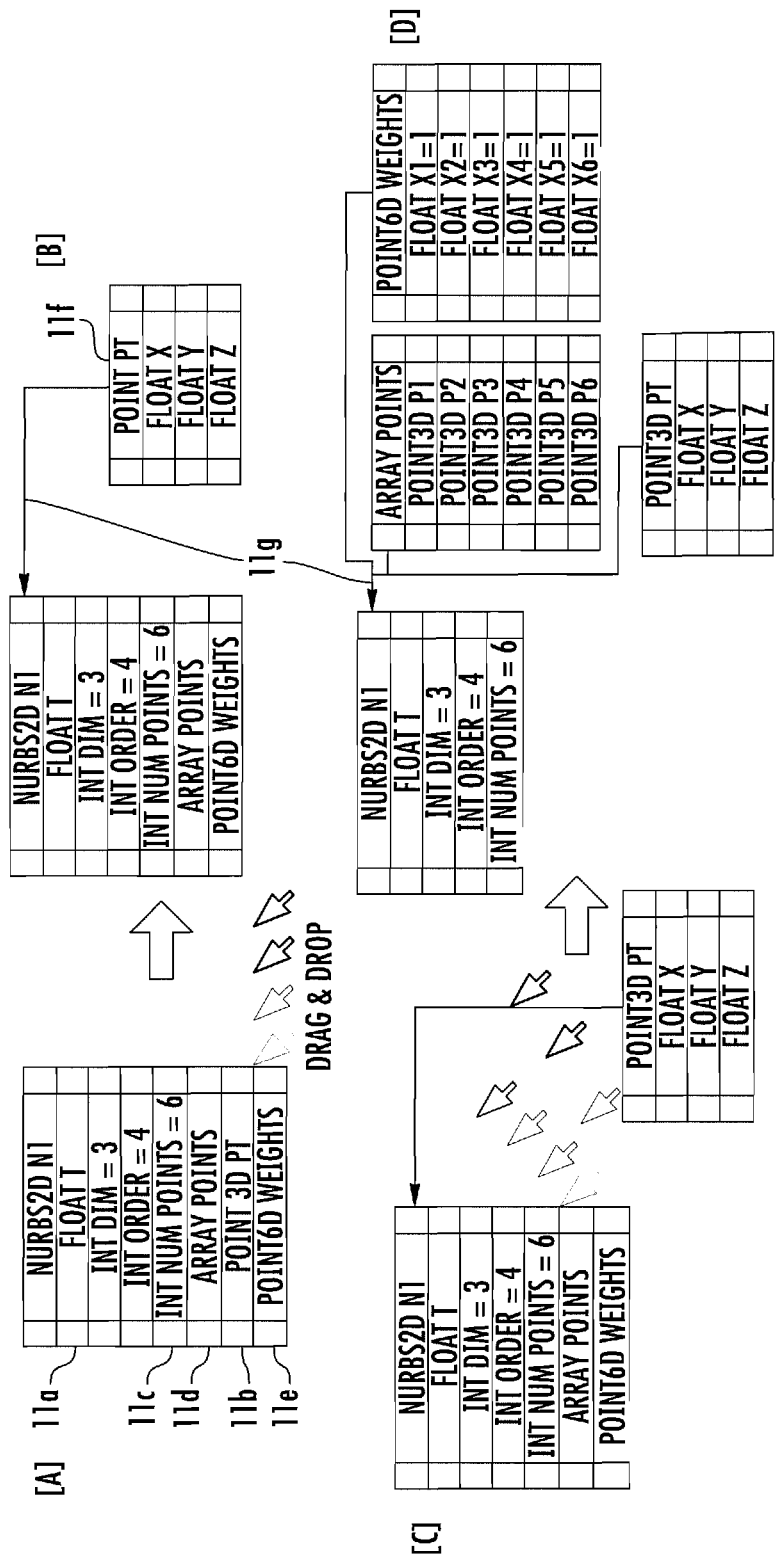
FIG. 11 illustrates a NURBS module in an embodiment of the invention.

FIG. 11A shows a NURBS module in an embodiment of the invention. Different properties of the NURBS can be accessed as child modules, including the t-parameter (11*a*) which is linked to 11*b*, the position on the curve, P(t), as depending on t; the number, n, of control points on the curve (11*c*); an array containing the control points (11*d*); and an array of floats containing the weights, represented here as an n-dimensional point with the same dimension as the number of control points (11*e*.) FIG. 11 shows another feature implemented in the current embodiment of the invention: The user can to drag a child module from its parent module onto the visual area, called the module area, where it changes to a form that allows the user to expose its own child nodes. FIGS. 11A and B visualize the P(t) module (11*b*) being dragged from its parent module onto the module area, turning into a module in its own right and enabling the user to access the child properties (11*f*.) FIGS. 11C and D shows the control point array and weight array also being dragged to the module area. From here on, connections and functional relations can be created internally within the modular hierarchy. In order to relay the structure of the hierarchical tree to the user, an arrow or similar graphical indicator can point from a child module back to the parent (11*g*).

Figure 12:
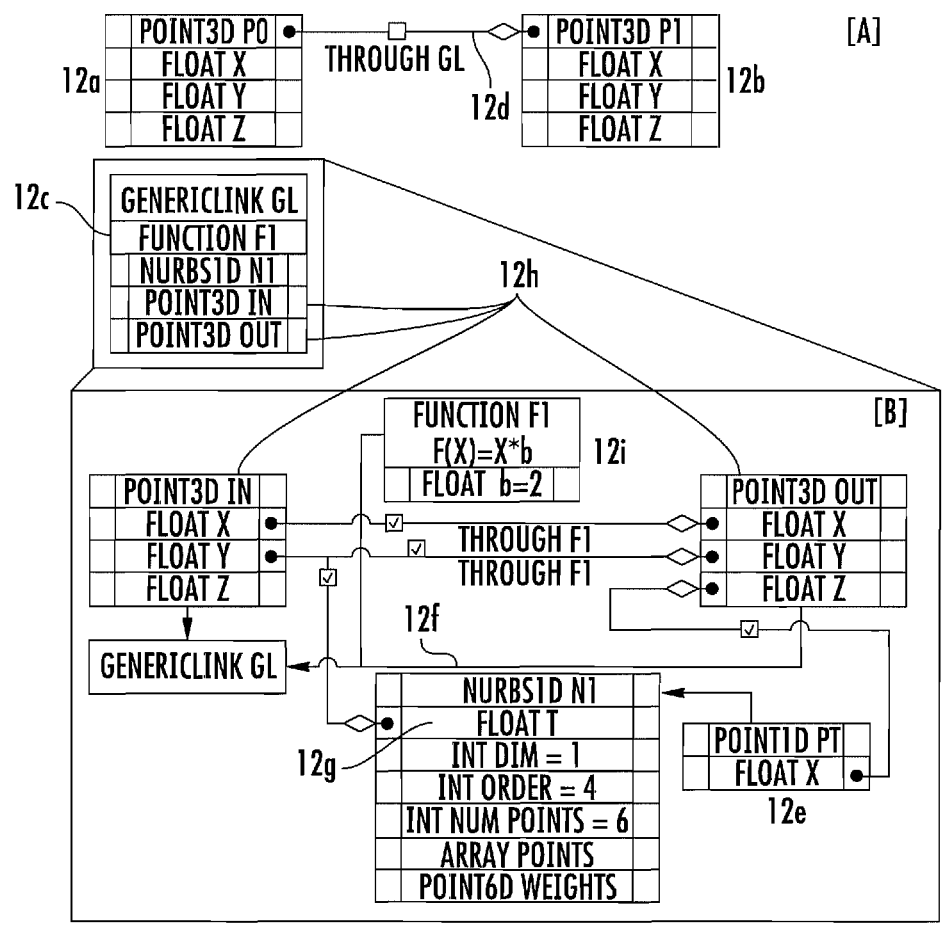
FIG. 12 illustrates functional modules built in a modular fashion having two vectors (12a,12b) linked via a generic link module, GL (12c) through a binding (12d)

A highly potent feature of the invention coupled with a hierarchical approach is the possibility to build functional modules that are themselves built in a modular fashion. One such example can be seen in FIG. 12, where two vectors (12*a*, 12*b*) are linked via a generic link module, GL (12*c*) through a binding (12*d*). FIG. 12B, shows the internal modular setup of the generic module as some of its child modules have been dragged to the module area. Furthermore, the child module PT (12*e*) from the NURBS module N1 (12*f*) has been dragged to the modular area. As mentioned earlier concerning FIG. 11, the PT module is connected to the T module (12*g*) in that PT outputs the positional value of the curve at the parameter value set by T. In addition, the generic module contains an input point, IN, and an output point, OUT (12*h*), both of which are mathematically identical to a vector and will therefore henceforth be referred to as such. The x-coordinate of the input vector is connected to the x-coordinate of the output vector via a multiplication module (12*i*) that multiplies the value with 2, and the same with the y-coordinates. The z-coordinate of the input vector is ignored, while the y-coordinate connects to the z coordinates of the output vector via the curve N1. The latter is achieved by routing the y coordinate to the T module of the curve and then further routing the output of the curve to y and z. The result of this is a functional module that scales the incoming vector values by a factor of two in the x-y plane, while making the z-value a function of y-position as determined by the shape of the NURBS.

Implementation

A typical class structure may be as shown in FIG. 13. A basic module class, 13*a*, contains a list of property modules, that is, modules that control some inherent characteristics of the module; a list of child modules, modules that are merely related to the parent module hierarchically as suitable for the user; a name and a global identifier. A module capable of participating in bindings, 13*b*, inherits the base module class and simply adds an array of bindings. The bindings related to a module may also be stored in a local database, but defining them on the module level is more transparent.

A binding may be defined as 13*c*; also having a name and a global identifier. In addition, the binding contains a reference to the sender module and the receiver module, as well as a list of the functional modules (henceforth called link modules due to the possibility of chaining them) through which the data from the sender should be sent through. A binding may—similarly to regular modules—contain a number of property modules, so that the inherent properties of the binding can be controlled via the same binding mechanics as the rest of the engine.

A link module may be defined as 13*d*, inheriting all the properties of the basic module; that is, without being able to bind. Link modules could of course be allowed to explicitly bind to other modules simply by inheriting 13*b*, but that would betray the purpose of this type of module as a multi-use function for functional chains. Besides from the properties inherited from 13*a*, links should contain a method that receives an input and produces the proper output according to the setup and properties of the module, as well as a list of the bindings in which the module participates.

Informing the user about the functional modules that participate in the modulation chain of a binding can be done in multiple ways. For instance, when the user hoovers the mouse over the binding a tool tip may be displayed that shows the binding chain in a list, or right clicking on a binding may open up a menu or a popup window displaying a similar list. Both the menu and the popup window may easily be fitted with controls to add or remove functional modules from the binding's chain modulation list, while a tool tip would usually only contain information. An example of a binding property window can be seen in FIG. 14.

Figure 15:
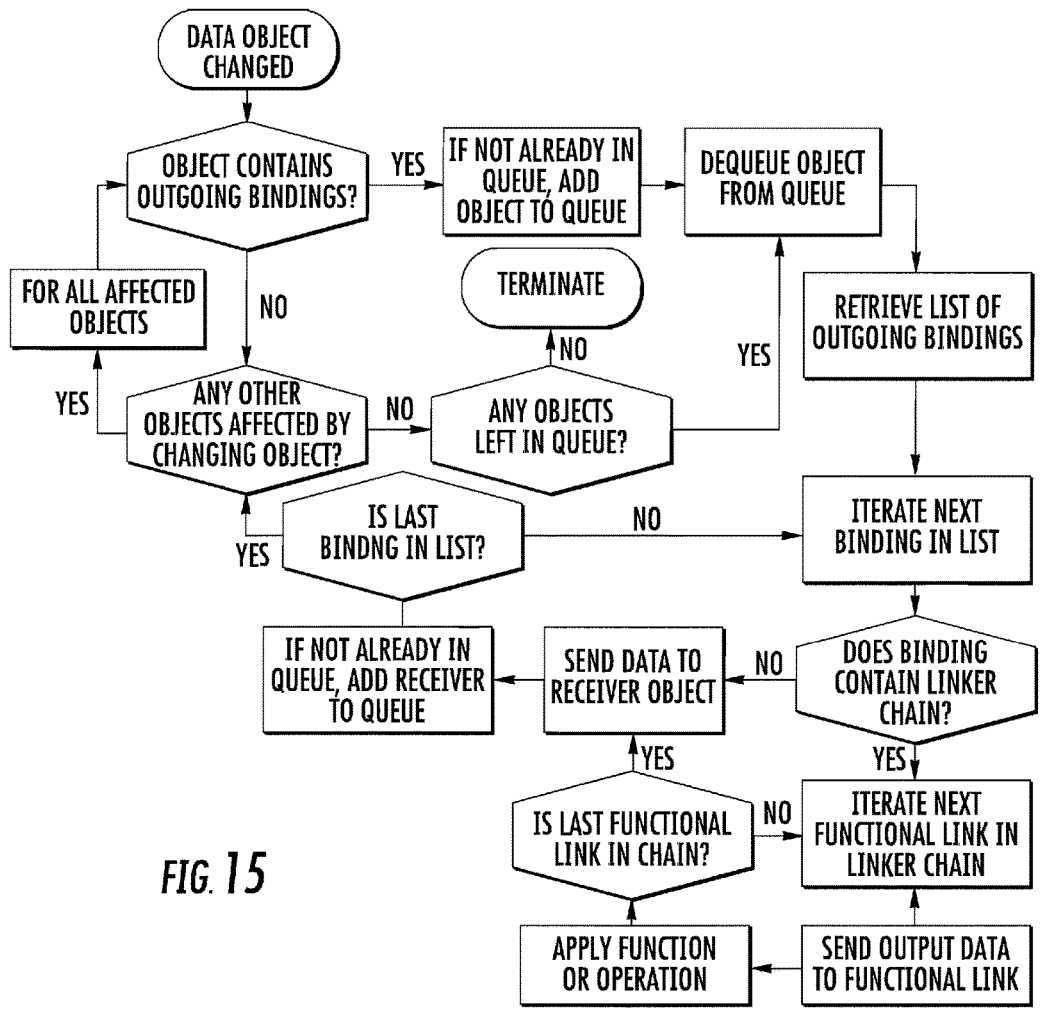
FIG. 15 illustrates a que looping algorithm.

When an instance module changes, the modular engine will check for bindings emitting from the module and for each binding transmit the data to the receiver, either directly or by routing it through the functional chain of the binding if one exists. Implementing the binding functionality itself can be done in a number of ways. It may be done completely recursively or completely iteratively according to preference and requirements. A queue looping algorithm is displayed in FIG. 15: A binding is initiated by a sender module, and after transmitting its data through its bindings, each receiving module that itself contains bindings is added to a queue. In addition any modules affected by a change in the sender module are added to the queue; this may for instance be the curve parent module of a point module—when the point changes, the curve changes, or the affected module may be a functional module which means that all the receiving modules of the bindings that the functional module participates in needs to be added as well. Then one module is in turn dequeued from the queue and the same procedure continues with this module, queuing and dequeuing modules until the queue is empty. In the algorithm in FIG. 15, the receiving modules have first priority in the queue, although those roles may just as well be reversed or even mixed depending on the receiving module.

Figure 16:
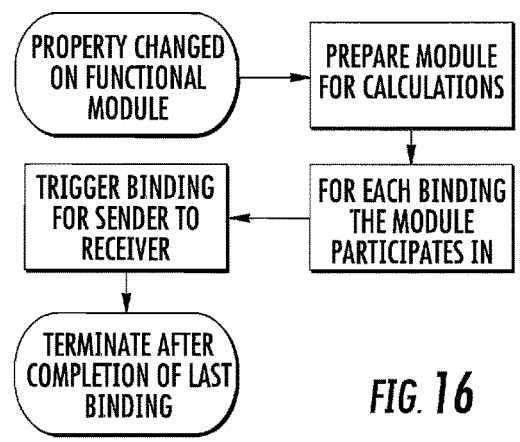
FIG. 16 illustrates various steps involved in link module changes.

A notable feature of the invention is that the functional link modules can participate in any number of bindings and at the same time can interact with the engine as a regular module. This means that when a link module is changing state, all active bindings going through the link should be notified and binding should be initiated as seen in FIG. 16.

Figure 17:
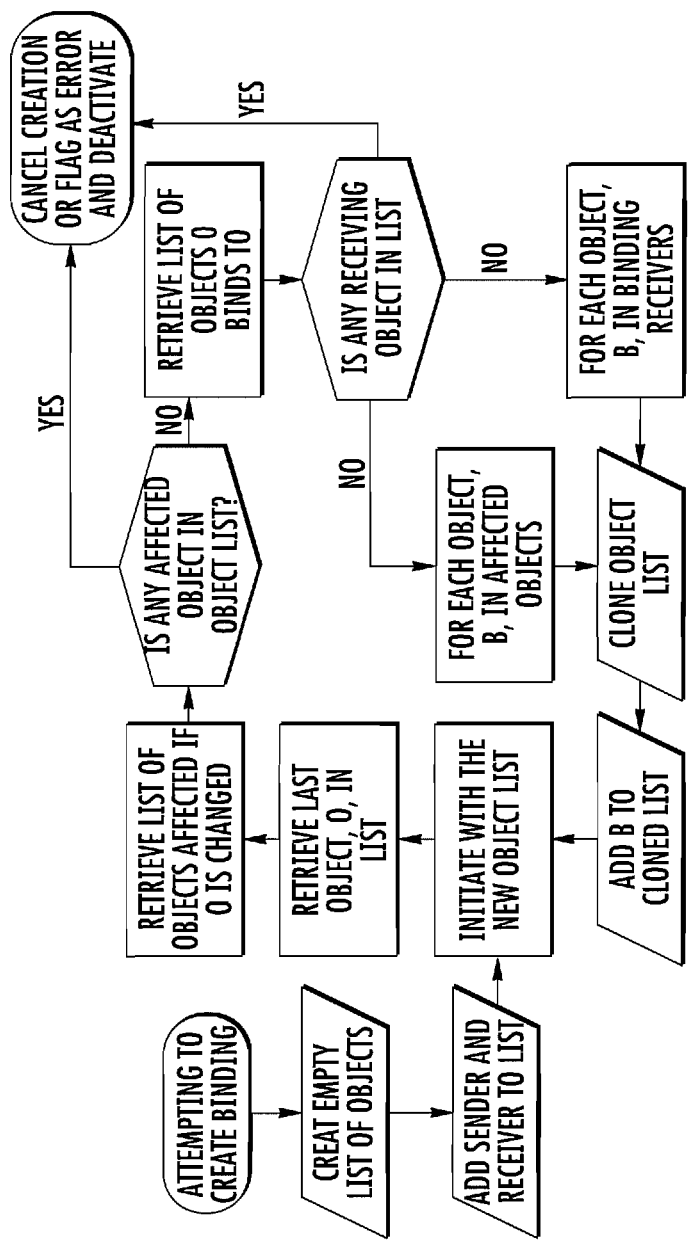
FIG. 17 illustrates an example of a binding test algorithm.
Figure 18:
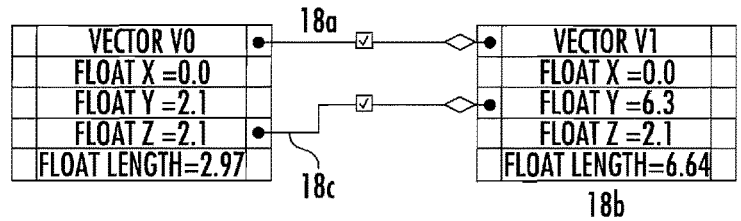
FIG. 18 illustrates direct binding, 18a, between two vectors which influence the three coordinates of vector 18b.

The creation of infinite loops in this algorithm is to be avoided. A simple way to achieve this is to analyse the dataflow when a binding is being created and either disallow the binding if it causes an infinite loop or simply disable it. In FIG. 17, such an algorithm is displayed. What is does, is to simply intercept when a binding is about to be created and test recursively whether any data flow branch in the modular setup loops back upon itself at some point. This is done by testing for both indirectly affected modules as well as the binding data flow. By testing each individual branch completely separately, it is possible to set up multiple bindings that influence the same object. This is shown in FIG. 18, where a direct binding, 18a, between the two vectors influence all three coordinates of vector 18b, while a specific binding, 18c, creates a separate binding between the z-coordinate of the sender and y-coordinate of the receiver through the functions F0 and F1 (not shown). The binding test algorithm in FIG. 17 recognizes that even though there is redundant data transfer, it is not in the form of a loop.

Practical Examples

An example of a functional module that may be useful for CAD applications is a so-called sub-curve filter, that is, one that takes a parametric curve as an input and produces a specified segment of that curve. Any type of curve may be used, but most useful to CAD would be spline curves, especially NURBS curves. As mentioned, NURBS curves are defined in an interval from lowest ($k_0$) to highest ($k_{n+order}$) knot value and methods and software exist for accurately cutting a segment out of a NURBS in a specified sub-interval [$a \geq k_0 \ldots b \leq k_{n+order}$] (see http://www.sintef.no/Projectweb/Geometry-Toolkits/GoTools/ as available at the filing date of the instant application) where n is the number of control points. The sub-curve filter may thus be defined either by an absolute interval, which might not be applicable to all curves sent through the function, or by a relative normalized interval, e.g. between [0 . . . 1].

Figure 19:
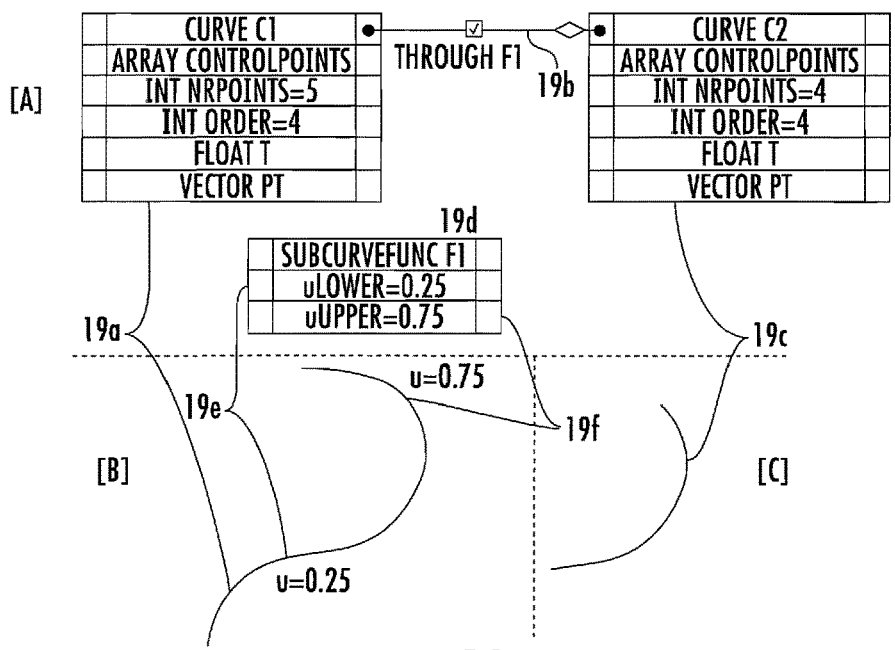
FIG. 19 illustrates an example of a sub curve filter.

An example of such a sub-curve filter is shown in FIG. 19. One primary curve (C1), shown both in its modular (A) and regular CAD GUI form (B) indicated by 19a, routes through a binding (19b) to another curve, C2, similarly shown in both its modular (A) and typical GUI forms (C) indicated by 19c. The curve modules may contain basic property-related child modules such as an array of control points, a number to get or set the number of control points, a number to get or set the order of the NURBS curve, and may also contain non-property related modules such as T and PT in this example. T is a value between $k_0$ and $k_{n+order}$ and when T changes, PT is updated with the parametric value of the NURBS at T, something that can be used for a multitude of purposes, one of which will be covered later. The binding 19b references a single functional module (19d) which is a sub-curve filter module. The important properties of the functional module are the upper and lower value of the sub-interval applied by the module, 19e and 19f. For visualization purposes, 19e and 19f also show the points along the curve represented by these two parametric values. When C1 changes, its curve data is routed to 19d through 19b to produce a sub-curve defined by the sub-interval from 19e to 19f which is received by C2, forcing it to change shape accordingly. In this fashion, a sub-curve filter can be thought of as a way to control other curves rather than for creating new ones. C2 will persist even if the binding 19b is deleted. This can be useful for recycling features in a design or for making design features persistent across a number of features and/or products. The modular setup thus makes it possible to create and manipulate a model of a physical structure in a CAD application.

Figure 20:
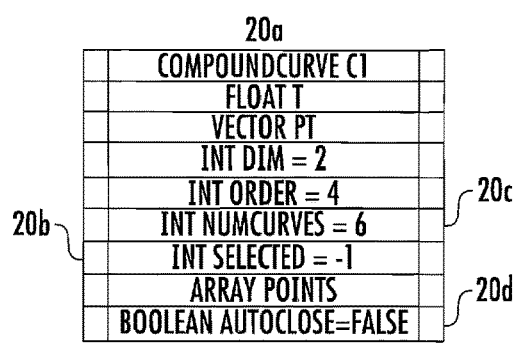
FIG. 20 illustrates a compound curve module.
Figure 21:
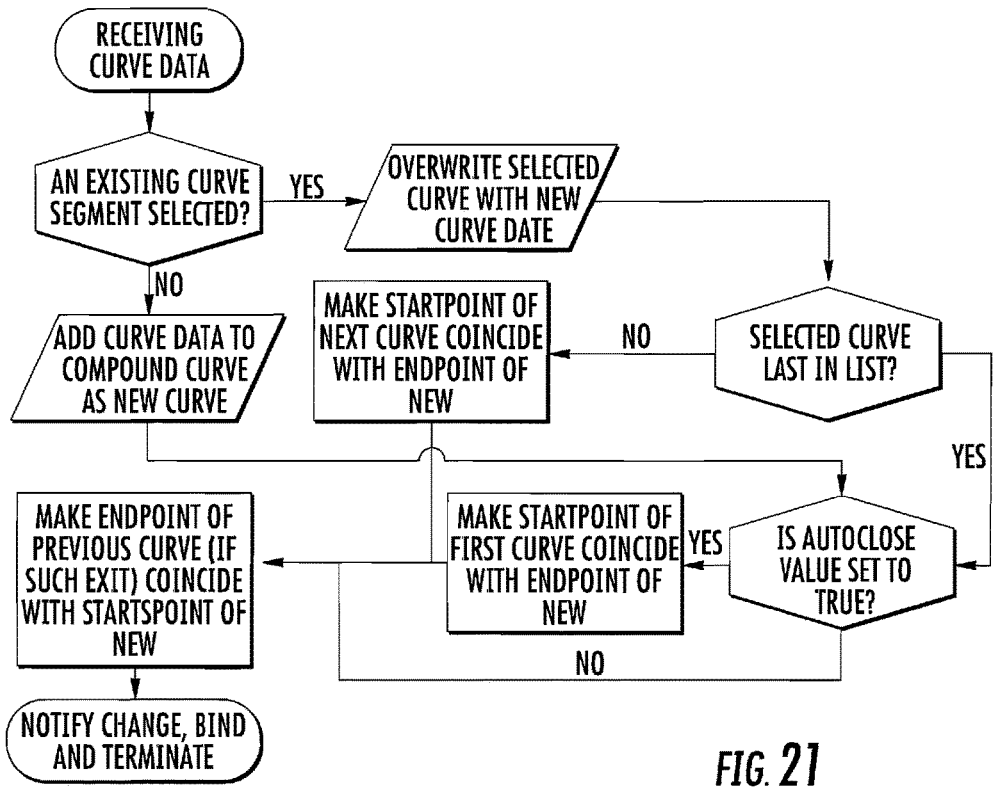
FIG. 21 illustrates an algorithm for adding curves directly or modifying an existing curve via indexing.
Figure 22:
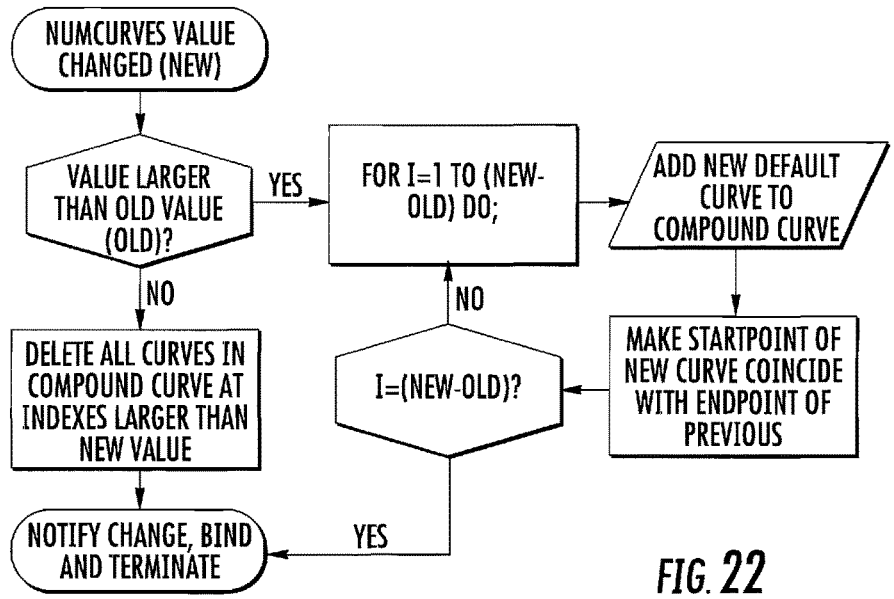
FIG. 22 illustrates an ajgorithm for how curves can be added or deleted by setting the number of curves.

In addition to the persistence of features, the sub-curve filter can be used in conjunction with other modules to create complex base features for designs while making it easy to change the overall shapes. One way may be through the use of a compound curve module, such as that seen in FIG. 20 (20a). A compound curve is a curve created by joining individual curves end-to-end, and a compound curve module is a modular interface for creating and manipulating such a curve. The module may also contain a value that selects a specific curve segment for editing such as 20b, where a negative value means no curve is selected. In the specific type of compound curve module seen in FIG. 20, it is— among other methods—possible to add curves to the curve directly to the module or to specify the number of curves through 20c and then define the curves later. The "Auto-Close" Boolean value (20d) can be set to "true" or "false" and determines whether the module automatically joins the first and last curve in the compound curve. FIG. 21 shows an algorithm for adding curves directly or modifying an existing curve via indexing. FIG. 22 shows how curves can be added or deleted by setting the number of curves, after which they can be altered using FIG. 21.

Figure 23:
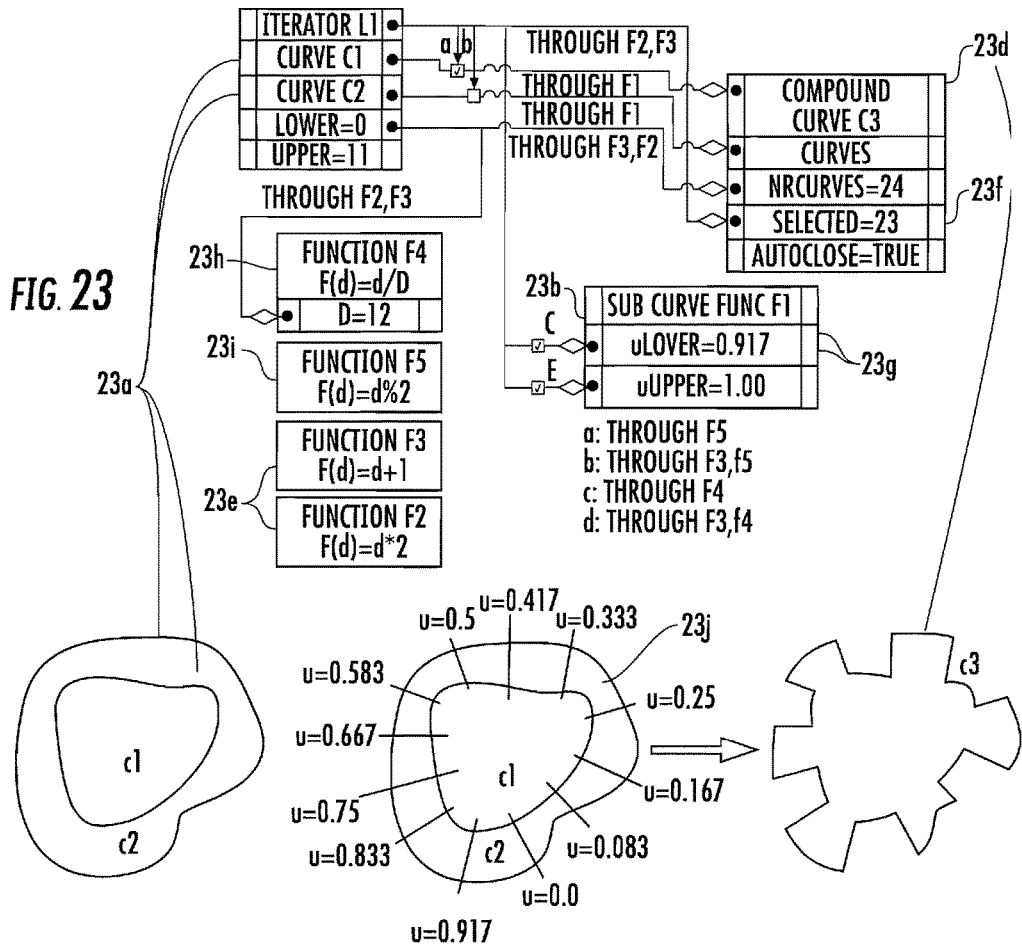
FIG. 23 illustrates a modular set up and corresponding results.

Using such a curve generator along with a sub-curve filter it is possible to make a number of complex designs in a fast yet concise fashion. An example of a modular setup and the corresponding result is given in FIG. 23. Two closed curves C1 and C2 (23a) are used as the basis for the system along with a sub-curve filter (23b) and an iterator module (23c) which is a simple module that when activated will output values from its lower to upper bound in steps of 1. On the receiving end is a compound curve generator that is set up according to the settings of the iterator module. The output curve from this generator is C3 (23d), which may be located anywhere; in another CAD-sketch, -entity or -layer or indeed on top of the other two curves. By using a range of functional modules in conjunction with the iterator module each curve-segment of the compound curve generator can be manipulated to create a segmented, closed curve that snakes in and out between the two curves.

First of all, the number of curve segments in C3 is set equal to twice the number of steps in the iterator, Upper+1, which is 12 in this particular case where the iterator counts from 0 to 11. This is done by adding one and multiplying by two via two functional modules F2 and F3 (23e). The selected curve segment of the compound curve (23f) is made dependent on the iterator value by multiplying by two and adding one. The upper and lower values of the sub-curve filter module are also controlled by the iterator value; the lower value is set to while the upper is set to through the functional modules F3 and F4 (23h). Since both curve C1 and C2 are routed through the sub-curve filter to C3 this would cause only one of them to actually influence the compound curve. To fix this, two additional bindings (a and b) are made from the iterator value to the on-off switch of their respective bindings. The binding from C1 routes through the functional module F5 (23i), a modulus operation that calculates the remainder of an integer division operation. Since the activation of a binding is a Boolean operation where a zero corresponds to "off" and a non-zero value to "on" this will turn on the binding at uneven values and off at even values. The binding from C2 routes first through a plus one functional module and then through the modulus operator, which results in the opposite; the binding being shut off at uneven and on at even values. Thus, for each value the iterator module steps through, a different curve segment in C3 will be selected and the sub-curve filter will apply a portion of C1 for uneven iterator values and a portion of C2 for even values. To force the curve to close automatically, the AutoClose value has been set to true. In FIG. 22, the iterator has just reached its last value of 11 for educational purposes 23i shows the parameter intervals that have been selected.

The key part to take home from this example is not only that changing the outlines of C3 can be done extremely easily by adjusting C1 and C2; making it possible to make the shape easily conform to some design guides for the desired physical structure. The key feature of the setup is indeed that simply by changing the maximum value of the iterator module, the number of segments on C3 automatically changes, instantly creating a large-scale change to the physical structure without having to do extensive and difficult redrawing. In terms of practical usage, such a setup may be used for a variety of design purposes, but the purpose of the example is to illustrate general principle of creating complex CAD designs via rules that allows extensive features to be changed swift and automatically. Whether you wish to change to e.g. 16 or 18 total segments, it can be done simply by changing the Upper value of the iterator module to 8 or 9 respectively.

The principle in the example can be applied to surfaces as well which may be used for instance to create cooling ribs automatically in a manner almost identical to the given example, allowing the designer to simply specify the number of ribs. Adding functionality for altering the size, height and position of the ribs may be done quite easily, making it possible to optimize the cooling efficiency according to the number and shape of the ribs with only a few variables. It can also be applied to curves, allowing part of—or the whole—curve to be governed either by mathematical formulas or by other curves.

Generic Link Modules

Figure 24:
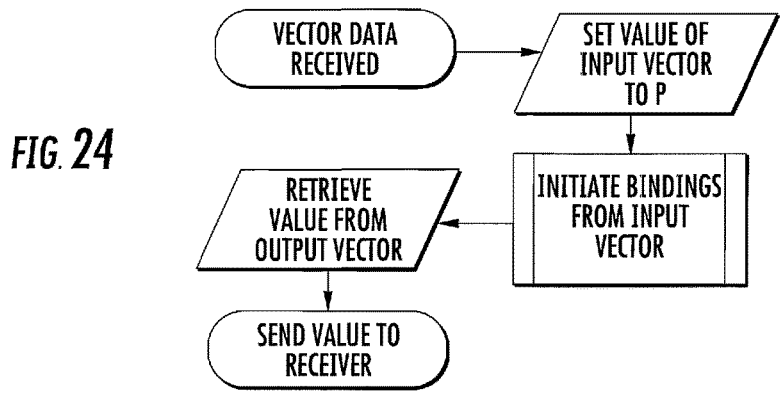
FIG. 24 illustrates an algorithm to apply generic modules to CAD objects like curves, surfaces and vectors.
Figure 25:
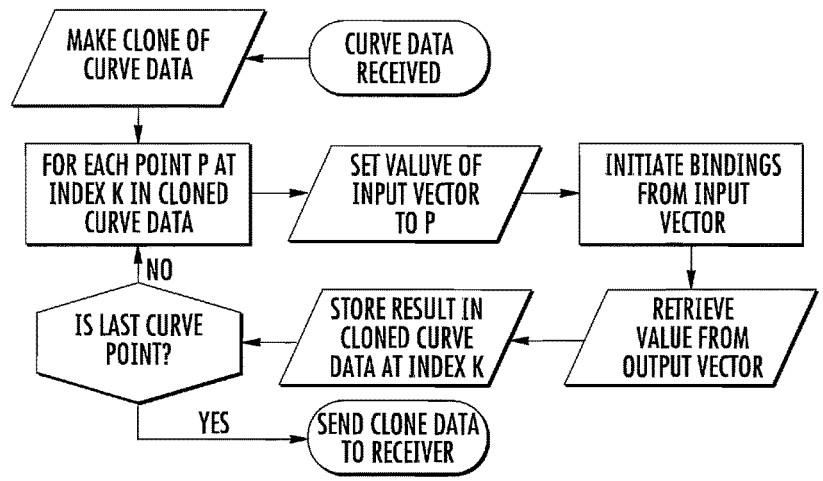
FIG. 25 illustrates an alternative algorithm to apply generic modules to CAD objects like curves, surfaces and vectors.

In order to apply generic modules to CAD objects like curves, surfaces and vectors, the algorithms shown in FIGS. 24 and 25 can be used. For vectors and points (FIG. 24), which could be a module as 12c in FIG. 12, it is simple: When the functional module receives a vector input during a binding, the IN vector of the module is set to the incoming value and internal binding in the functional module is initiated so that the bindings traverse from the IN vector to the OUT vector. Once the binding process has terminated, according to FIG. 15, the resulting value of the OUT vector is sent to the receiver, which might be another functional module in the binding chain or the receiver of the binding. For curves and surfaces, it is only slightly more complicated; if the module receives curve data via a binding, a clone is made of the data after which the algorithm in FIG. 25 iterates through each control point and for each applies the same algorithm as in FIG. 24, applying the result to the corresponding point on the receiving curve. The same principle applies to surfaces. In general, it is possible to create generic functional modules of this form where the input could be e.g. a vector and the output a scalar (float) or matrix—or any combination thereof.

Figure 26:
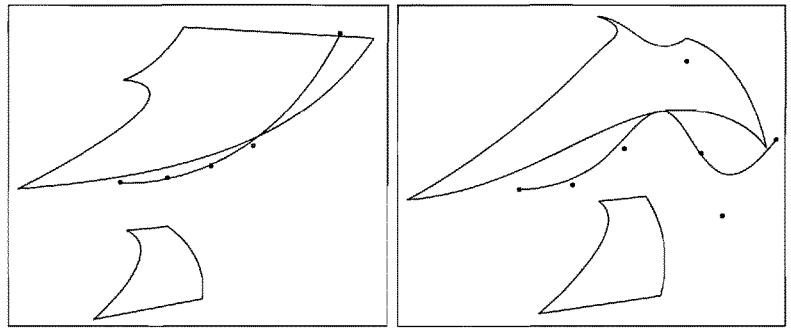
FIG. 26 shows two examples of applying the generic functional module in FIG. 12 to two surfaces.

FIG. 26 shows two examples of applying the generic functional module in FIG. 12 to two surfaces. It has simply been made by connecting the lower surface to the upper surface through a module as that shown in FIG. 12, using a curve (12f in FIG. 12) to specify the z-directional behaviour of the upper surface. This curve is shown in front of the upper surface for both figures. As can be seen in both examples, the general x-y plane layout is conserved—although enlarged by a factor of two—while the z-shape of the top surface is determined by the control curve. This makes it possible for designers to drastically or slightly alter the general concepts of both the base x-y layout and the z-directed curve and the top surface would respond immediately to the modifications. In other words, multiple design concepts can be combined or superimposed on a geometry with strict and predictable rules and immediate results.

Figure 27:
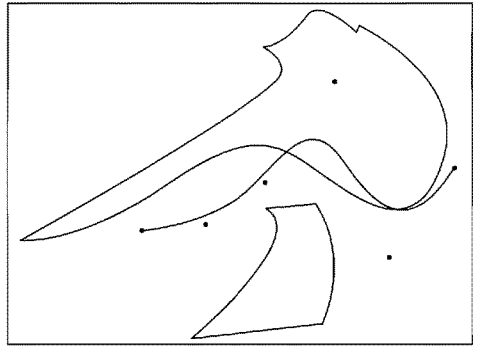
FIG. 27 illustrates a modular setup where the z-directed behaviour is fully imposed along the y-direction, regardless of the x-y layout.

It is similarly easy to create a modular setup where the z-directed behaviour is fully imposed along the y-direction, regardless of the x-y layout as seen in FIG. 27.

Figure 28:
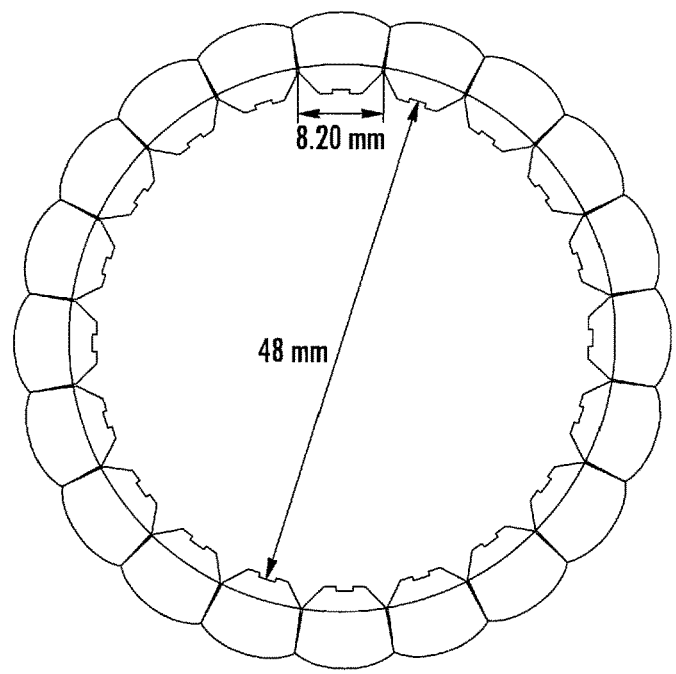
FIG. 28 illustrates an example of a segmented ring composed of small lenses to be used for Light-Emitting-Diode (LED) lighting, shown with 28 lenses.
Figure 29:
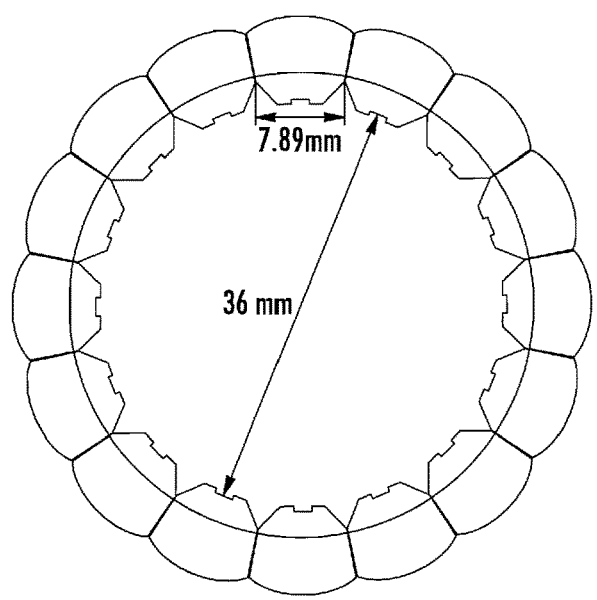
FIG. 29 illustrates an example of a segmented ring composed of small lenses to be used for Light-Emitting-Diode (LED) lighting, shown with 16 lenses.
Figure 30:
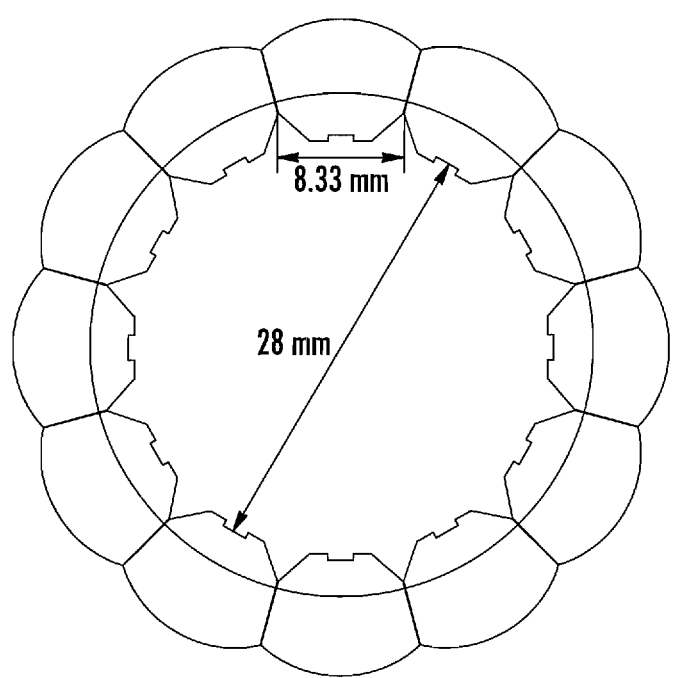
FIG. 30 illustrates an example of a segmented ring composed of small lenses to be used for Light-Emitting-Diode (LED) lighting, shown with 12 lenses.

FIGS. 28, 29 and 30 show a practical example for use in an engineering project, where the invention can been used to create a segmented ring composed of small lenses to be used for Light-Emitting-Diode (LED) lighting. The LEDs are to be situated in a slightly smaller concentric ring with the main optical axes of the LEDs pointing out in the radial direction so that each LED emits light into a lens. The rings are created by designing a lens with a rectangular profile compared to the trapez- or pie-piece shape seen in the figures, and then applying a couple of matrix transform via functional modules in order to make them conform to both the size of the ring and the number of desired lenses on the ring. This has the consequence that it is extremely easy to change the radius of the ring and the number of lenses it consists of; it is a simple matter of changing a single number to set the radius and a single number to set the required number of lens segments, and in a similar fashion to the compound-curve example from FIG. 23 the design automatically conforms. This is demonstrated in the figures where FIG. 28 has 20 lenses on an Ø 48 mm ring, FIG. 29 has 16 lenses on an Ø 36 mm ring, and FIG. 30 has 12 lenses on an Ø 28 mm ring. Indeed, taking and clipping the screenshots of the rings took more time than altering their basic design.

The invention claimed is:

1. A computer-implemented method for generating and visualizing data structures in a computer system, wherein each of said data structures comprises a plurality of nodes in a tree structure, and wherein the plurality of nodes comprises primary nodes, which comprise intrinsic properties, and optionally secondary nodes which are void of intrinsic properties, said primary and secondary nodes comprise arrays of data including one or more vectors, at least one of said primary and secondary nodes represents a data object of or a data interface towards a computer-implemented model of a physical structure, the method comprising the steps of:

generating a plurality of said nodes;

creating a visual representation of the plurality of nodes in a graphical user interface of the computer system, in which the nodes are represented as a plurality of data modules;

providing functionality in the graphical user interface allowing a user of the computer system to select data modules from said plurality of data modules and to combine the selected data modules to build said data structures;

generating mutual functional relations between data values of at least two of said primary nodes, so as to at least partially define said computer-implemented model on the basis of the intrinsic data of the primary nodes and on the basis of said mutual functional relations, wherein said mutual functional relations are determined on the basis of user selection defining the functional relation either so as to equate the respective data values of the at least two nodes or so as to define the functional relation as a functional call, which takes the data value of one primary node as an input and produces an output which sets the data value of another primary node;

and wherein the user interface comprises functionality permitting a user of the computer system to define functions which can be referenced in or called by said functional relations.

2. The method according to claim 1, wherein at least some of said data modules define functions, and wherein at least one of the mutual functional relations between data values of the at least two of said primary nodes includes links to at least one of said functions.

3. The method according to claim 1, wherein the entire said data structures are hierarchal data structures.

4. The method according to claim 1, wherein said functional call of said functional relation comprises a call to a chain of functions.

5. The method according to claim 4, wherein said chain of functions comprises at least two functions, wherein each function produces an output, which a next one of the functions takes as an input.

6. The method according to claim 1, wherein a point of data reception for at least one of said functional relations is visually represented in the graphical user interface.

7. The method according to claim 1, wherein a point of data transmission for at least one of said functional relations is visually represented in the graphical user interface.

8. The method according to claim 1, wherein the step of creating the visual representation of the data structures comprises visualizing said functional relations.

9. The method according to claim 1, comprising the step of providing an option for a user selection to disable and enable said functional relations.

10. The method according to claim 1, wherein said arrays of data further include multi-dimensional matrices.

11. A computer-implemented method according to claim 1, wherein the computer system embodies a computer aided design (CAD) system, and wherein the physical structure comprises an assembly of components in said CAD system.

12. A computer system comprising a hardware processor, a storage medium accessible by said hardware processor, and a user interface, wherein the storage medium is loaded with program including functionality for causing the hardware processor and user interface to carry out the invention according to claim 1.

* * * * *